United States Patent [19]
von Allwörden

[11] 4,157,838
[45] Jun. 12, 1979

[54] COUPLING HOOK FOR FARM TRACTORS

[76] Inventor: Wilhelm von Allwörden, Erback, Fed. Rep. of Germany

[21] Appl. No.: 839,308

[22] Filed: Oct. 4, 1977

[30] Foreign Application Priority Data

Oct. 8, 1976 [DE] Fed. Rep. of Germany ....... 2645479

[51] Int. Cl.² .............................................. B60D 1/10
[52] U.S. Cl. .................................................. 280/508
[58] Field of Search ................... 280/508, 509, 456 A, 280/460 A

[56] References Cited

U.S. PATENT DOCUMENTS

| | | | |
|---|---|---|---|
| 763,771 | 6/1904 | Lukens et al. | 280/508 |
| 774,903 | 11/1904 | Ammann | 280/508 |
| 2,397,558 | 4/1946 | Mennen | 280/509 |
| 2,429,761 | 10/1947 | Ketel | 280/508 X |
| 4,014,562 | 3/1977 | Kunze | 280/509 X |
| 4,071,263 | 1/1978 | Kunze | 280/509 X |

Primary Examiner—Joseph F. Peters, Jr.
Assistant Examiner—Norman L. Stack, Jr.

[57] ABSTRACT

A coupling hook for a three-point linkage on a farm tractor includes a coupling jaw or opening for receiving in locking engagement a coupling bolt secured on a piece of farm equipment. Associated with the jaw is a locking bolt mechanism which includes an elongated locking bolt pivotally mounted on a lever with a spring biasing the mechanism into the locking position. In the locking position, the lever mounting the locking bolt is held between a fulcrum and a rear wall on the coupling hook. The locking bolt has a nose-like projection at one end which secures the coupling bolt in locking engagement. Removing the lever from between the fulcrum and the rear wall releases the locking bolt so that the coupling can be removed from the coupling hook jaw.

3 Claims, 4 Drawing Figures

ере

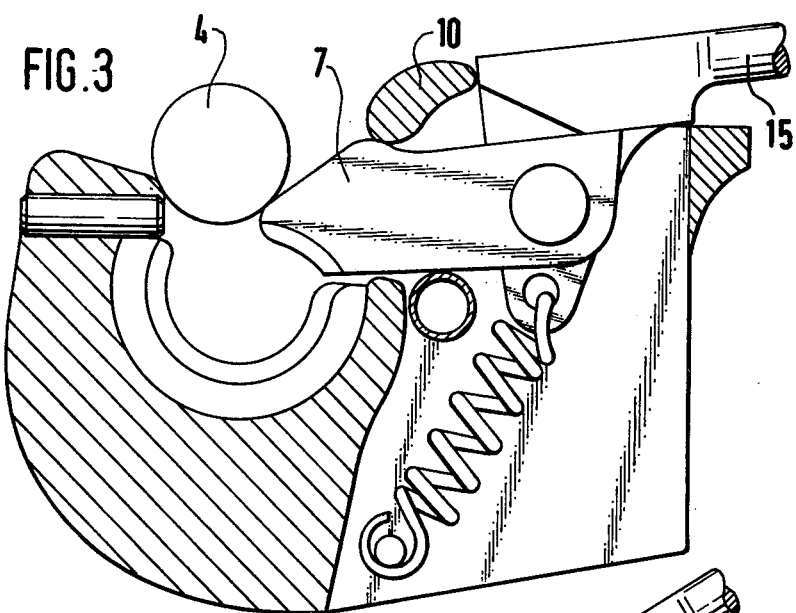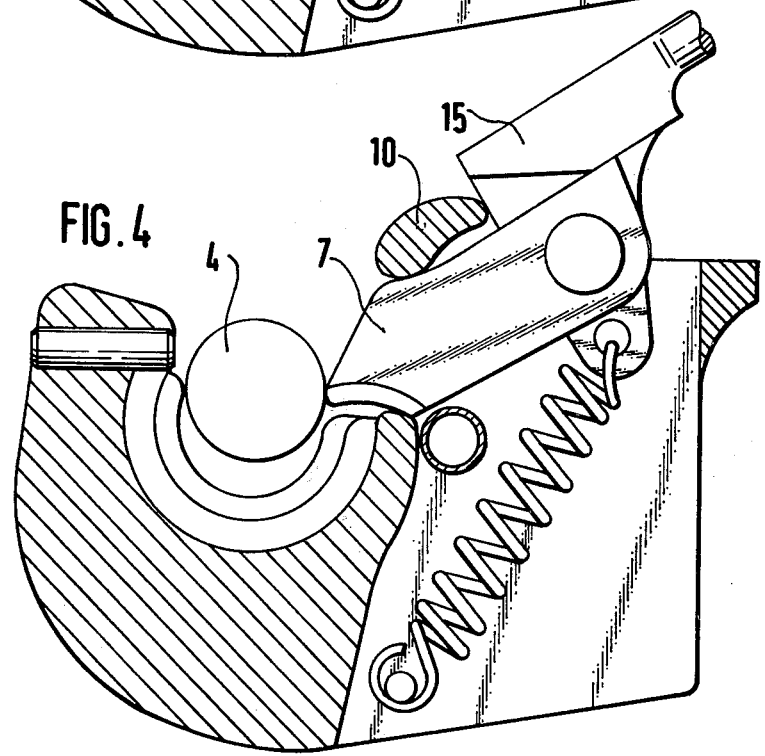

COUPLING HOOK FOR FARM TRACTORS

FIELD OF THE INVENTION

The present invention relates generally to a coupling hook for a tractor or similar vehicle and, in particular, to a coupling hook for the lower guides of a three-point linkage on a farm tractor.

BACKGROUND OF THE INVENTION

Hooks for coupling onto bolts or pins attached to a piece of farming equipment comprise, in general, a semi-circular concave jaw-like member arranged to receive the bolt. Such coupling hooks where the bolt extends through a jaw in the hook are in common use today.

These coupling mechanisms presently in use leave much to be desired. To release the coupling bolt, the hook must be pulled off the bolt in the tangential direction. Such tangential movement involves a certain amount of friction between the coupling bolt and the cooperating end of the locking bolt of the coupling hook. This friction can be very damaging, especially in agricultural operations because of the considerable amount of dirt and grit present which causes abrasive wear on the contacting parts. Due to such abrasive wear the coupling bolt will start to rattle in the coupling hook and the hook will begin to whip.

Furthermore, the cylindrical seating area for the coupling bolt in the opening or jaw of the coupling hook is very vulnerable because the access of dirt into this region cannot be prevented in farming operations.

SUMMARY OF THE INVENTION

Accordingly, it is the primary object of the present invention to provide a coupling hook which is completely insensitive to the presence of dirt or grit in the jaw holding the coupling bolt and which hook can be lifted straight off the coupling bolt as soon as the locking engagement is released. Further, the invention avoids any accidental opening of the coupling hook and provides an arrangement intended to keep production costs down.

In accordance with the present invention, the locking bolt displaceably mounted in the coupling hook is effectively locked in place with the aid of a drag-lever articulately connected to it. The locking bolt is held in locking engagement by the drag lever disposed in form-fitting engagement between a fulcrum and a rear wall on the coupling hook. A tension spring connected to the coupling hook and the drag-lever secures the locking mechanism in locking engagement with the coupling bolt. By pivoting the drag lever about the fulcrum the locking bolt can be displaced outwardly from the coupling jaw releasing the coupling bolt. The end of the locking bolt which projects into the jaw has a chamfered surface directed upwardly away from the coupling bolt which facilitates movement of the coupling bolt into the jaw with the locking bolt being pivotally supported on a pin or similar abutment located on the coupling hook.

The end of the locking bolt which engages the coupling bolt has a concave face and the arrangement of the locking bolt and drag-lever permits the movement of the locking bolt radially away from the coupling bolt at the commencement of the releasing operation. The locking mechanism is arranged so that its functional efficiency cannot be adversely affected by the presence of dirt or grit.

Another advantageous feature of the present invention is the arrangement of a guide cam on the locking bolt which engages the fulcrum or counter bearing on the coupling hook. The abutment surface on the guide cam is at all points smaller than the lowest pitch of the concave face on the end of the locking bolt which engages the coupling bolt. This special design of the guiding cam on the locking bolt ensures the immediate radially directed disengagement of the nose-like projection on the end of the locking bolt from the coupling bolt at the very outset of the releasing operation.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the Drawing:

FIG. 3 is a view similar to FIG. 1 showing the automatic opening of the locking mechanism in the coupling hook caused by the gravitational engagement of the coupling bolt acting on the locking bolt as the displacement of the coupling bolt into the jaw of the coupling hook commences; and FIG. 4 is a view similar to FIG. 3 illustrating the jaw in the coupling hook in the fully open position with the coupling bolt moving into the jaw.

DETAILED DESCRIPTION OF THE INVENTION

Figure 1:
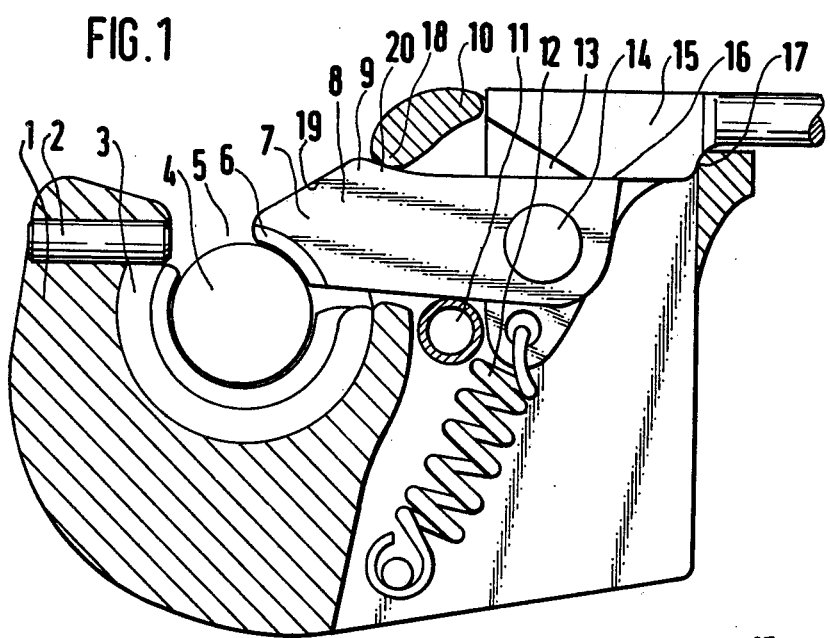
FIG. 1 is an elevational view, partially in section, of a coupling hook in locked engagement with a coupling bolt.

As shown in FIGS. 1–4, the coupling hook 1 has an opening or jaw 5 containing a jaw-liner 3 secured in place by a pin 2. The coupling hook forms part of a linkage on a tractor or similar vehicle for attachment to a farming implement or the like. A coupling bolt 4 attached to the farming implement, now shown, is positioned within the jaw 5 seated in the jaw-liner 3. As shown in FIG. 1, a locking bolt 8 extends through an opening in the coupling hook 1 and at its end extending into the jaw 5 the locking bolt 8 has a nose-like projection or catch 7 which contacts the coupling bolt 4.

In the locked position of the coupling bolt displayed in FIG. 1, a concave face 6 on the projection 7 is in surface contact with the coupling bolt. In this position, a guiding cam 9 on the upper surface of the locking bolt 8 is in engagement with the lower surface of a fulcrum 10 formed on the coupling hook and securing the locking bolt against movement in the radial direction relative to the coupling bolt. In addition, the locking bolt is locked against movement in the tangential direction and this locking action is accomplished by a drag-lever 15 articulatedly connected to the locking bolt by a bearing 14. In the locked position, the drag-lever 15 is held in form-fitting engagement between an end surface on the fulcrum 10 spaced from the surface on the fulcrum contacting the locking bolt, and the rear wall 17 of the coupling hook. A tension spring 12 secured at one end to the drag-lever and at its other end to the coupling hook holds the drag-lever and the associated locking bolt 8 in the locked position preventing tangential movement of the locking bolt relative to the coupling bolt 4. The bearing 14 is formed on the drag-lever cam 13.

To release the coupling bolt 4 from the jaw 5 in the coupling hook 1, the drag-lever 15 is lifted at its end spaced outwardly from the coupling hook in opposition to the force of the tension spring 12. During this lifting action, the end of the lever adjacent to the jaw 5 bears against the fulcrum 10. This releasing movement of the drag-lever cam 13 relative to the locking bolt 8 over the bearing 14 pulls the locking bolt tangentially away from the coupling bolt 4 so that the coupling bolt can be moved out of the jaw 5. Due to the shaped configuration of the guide cam 9, the disengaging movement of the nose-like projection 7 from the coupling bolt 4 can be effected without friction between the concave face 6 on the projection and the surface of the coupling bolt. It should be noted that the surface of the guide cam 9 has a smaller inclination or radius at all points than the smallest radius of the concave face 6 on the projection 7 of the locking bolt 8.

After the coupling bolt has been removed from the jaw 5, the locking mechanism moves the locking bolt 8 and the drag-lever 15 back into the position as shown in FIG. 1 due to the biasing action of the tension spring 12.

To couple a farming implement to a tractor, the jaw or opening 5 of the coupling hook 1 is lined up beneath the coupling bolt 4 of the implement and the lower guide, not shown, associated with the hook is raised. Such movement brings the outwardly inclined chamfer surface 19 on the upwardly facing portion of the projection 7 into contact with the coupling bolt, note FIG. 3. This bearing contact between the chamfer surface 19 and the surface of the coupling bolt 4 causes the locking bolt to pivot about the pin 11. As a result of this pivotal movement, the drag-lever 15 is lifted, note FIGS. 3 and 4, but maintained in an extended or straight position relative to the locking bolt by reason of the bearing 14 and its engagement with the locking bolt. The drag lever slides upwardly out of engagement with the rear wall 17 of the coupling hook so that the combination of the locking bolt 8 and the drag lever 15 execute a joint rearwardly directed movement due to the action of the coupling bolt against the chamfer surface.

Figure 2:
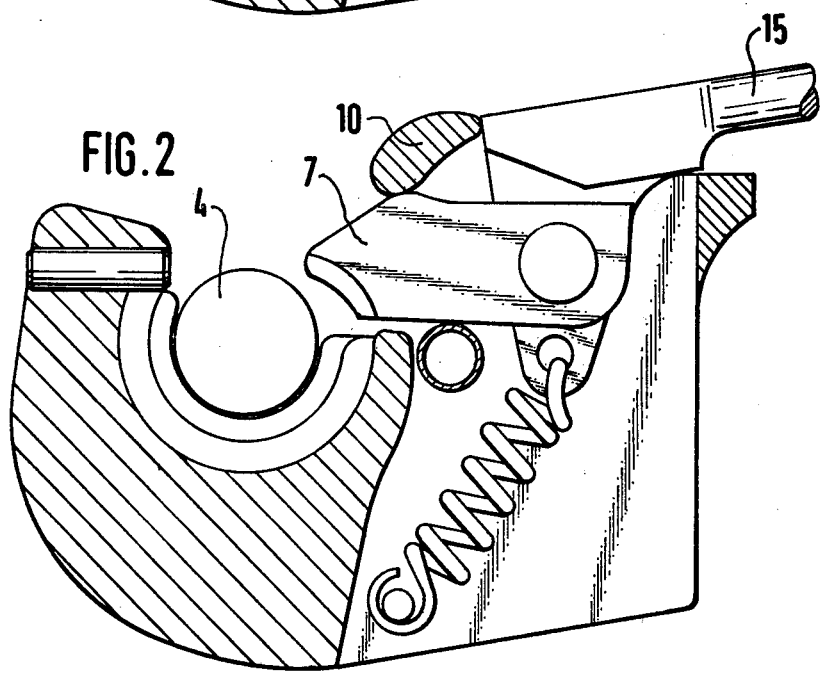
FIG. 2 is a view similar to FIG. 1, however, illustrating the coupling hook at the commencement of the coupling bolt releasing operation.

As can be seen in FIGS. 3 and 4 as the locking bolt 8 and the drag lever 15 are pivoted between the pin 11 and the fulcrum 10 with the guide cam 9 contacting the fulcrum 10, the locking bolt recedes from the opening or jaw 5 and the coupling bolt can move freely downwardly into the jaw. Once the coupling bolt is seated in the jaw as shown in FIGS. 1 and 2, the tension spring 12 causes the locking bolt and the drag lever to return into the locking position with the projection 7 passing through the opening formed in the coupling hook so that its concave surface 6 contacts the circumferential periphery of the coupling bolt. Further, the drag lever 15 returns to the position shown in FIG. 1 with its front end, that is the end closer to the jaw, contacting the fulcrum 10 and the shoulder on the drag lever spaced outwardly from the fulcrum bearing against the rear wall 17 of the coupling hook. Accordingly, the locking mechanism is again in the position as shown in FIG. 1 with the coupling bolt 4 locked in the jaw 5 of the coupling hook 1.

While specific embodiments of the invention have been shown and described in detail to illustrate the application of the inventive principles, it will be understood that the invention may be embodied otherwise without departing from such principles.

What is claimed is:

1. Coupling hook for use on the lower guides of a three-point linkage on a farm tractor or the like including a locking mechanism for locking a coupling bolt connected to a piece of farm equipment to be connected to the farm tractor, said coupling hook including a jaw having a concave surface for receiving and seating the coupling bolt, said coupling hook having an opening therein extending laterally from said jaw and open at one end into said jaw, and a locking mechanism for holding the coupling bolt in said jaw, said locking mechanism including an elongated locking bolt, said locking bolt having a first end and a second end with a nose-like projection on the first end of said locking bolt, said nose-like projection having a concave surface thereon, said locking bolt being movably displaceable through said opening for placing the concave surface on the nose-like projection into engagement with the surface of the coupling bolt within said jaw, wherein the improvement comprises a drag-lever articulatedly connected to said locking bolt at a position spaced from said first end thereof, said coupling hook including a rear wall spaced from said jaw and a fulcrum located between said rear wall and said jaw, said fulcrum having a first surface thereon located in the path of said locking bolt extending through the opening in said coupling hook and a second surface spaced from said first surface and located more remotely from said jaw than said first surface, a tension spring attached at one end to said drag-lever and at its other end to said coupling hook, said drag-lever having a first end located closer to said jaw and a second end spaced outwardly away from said jaw from said first end with said first end being in contact with said second surface on said fulcrum, a pin attached to said coupling hook adjacent the opening through said coupling hook and said pin being located on the opposite side of said locking bolt from said fulcrum, said locking bolt being pivotally supported on said pin, said locking bolt being movably displaceable between a locking position holding the coupling bolt in said jaw and a released position allowing removal of the coupling bolt from the jaw, said drag lever having a shoulder thereon spaced from the first end thereof, said drag lever secures said locking bolt in the locking position and in such position said drag-lever being form-fittingly secured between said fulcrum and said rear wall of said coupling hook with said shoulder on said drag-lever bearing against said rear wall, said first end of said locking bolt having a chamfered surface extending from said concave surface toward the second end thereof, and said chamfered surface in the locking position facing outwardly away from said jaw.

2. Coupling hook, as set forth in claim 1, wherein said locking bolt having a convex guide cam surface adjacent the end of said chamfered surface remote from said concave surface and said guide cam surface arranged to contact the first surface of said fulcrum as said locking bolt pivots on said pin.

3. Coupling hook, as set forth in claim 2, wherein said guide cam surface projects upwardly from said locking bolt away from said jaw in said coupling hook and said guide cam surface having a smaller radius for all points thereon than the radius of the concave surface on said locking bolt.

* * * * *